Dec. 11, 1962     A. W. GRANT ET AL     3,067,506
METHOD OF MAKING TIRE MOLDS
Original Filed Oct. 10, 1957     2 Sheets-Sheet 1
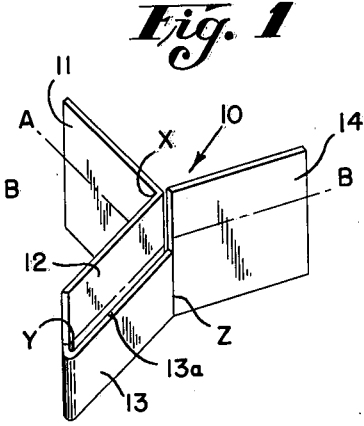
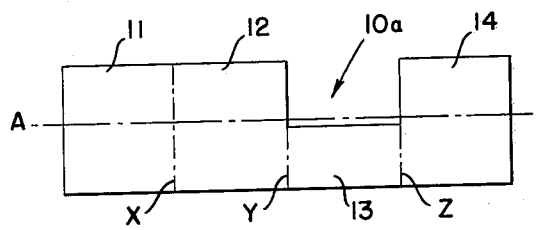
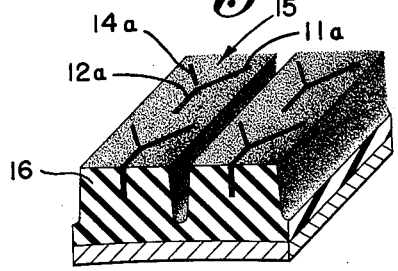
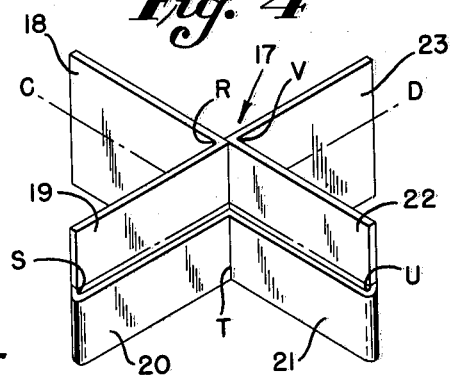
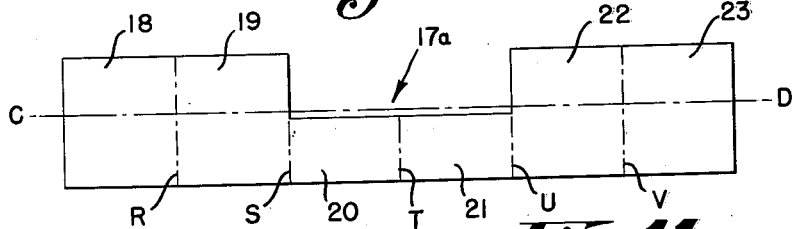
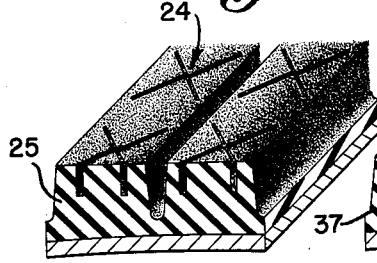
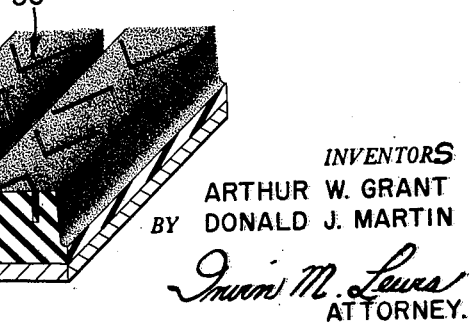
INVENTORS
ARTHUR W. GRANT
BY DONALD J. MARTIN
ATTORNEY.

Dec. 11, 1962 A. W. GRANT ET AL 3,067,506
METHOD OF MAKING TIRE MOLDS
Original Filed Oct. 10, 1957 2 Sheets-Sheet 2
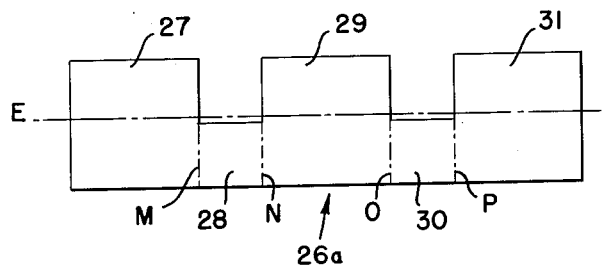
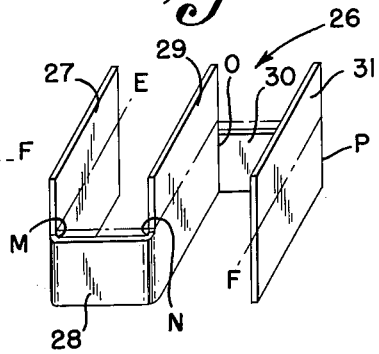
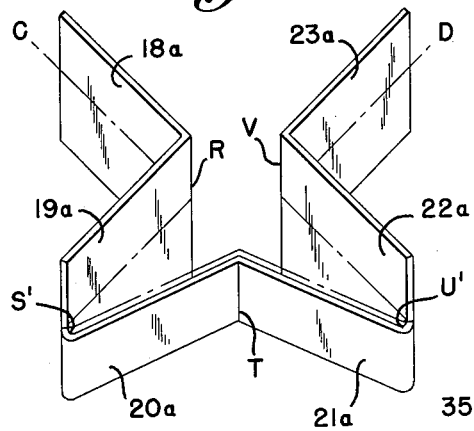
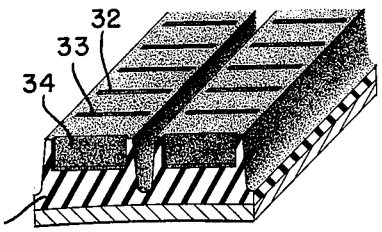
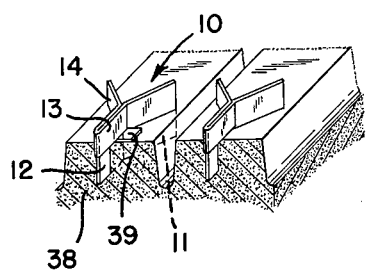
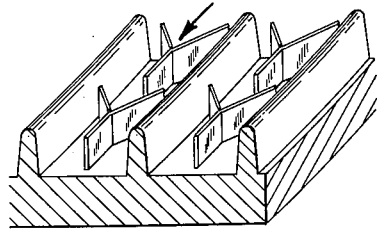
INVENTOR:
ARTHUR W. GRANT
BY DONALD J. MARTIN
*Irwin M. Lewis*
ATTORNEY.

United States Patent Office 3,067,506
Patented Dec. 11, 1962

3,067,506
METHOD OF MAKING TIRE MOLDS
Arthur W. Grant, Detroit, and Donald J. Martin, St. Claire Shores, Mich., assignors to United States Rubber Company, New York, N.Y., a corporation of New Jersey
Continuation of application Ser. No. 689,446, Oct. 10, 1957. This application July 1, 1959, Ser. No. 824,440
2 Claims. (Cl. 29—428)

This application is a continuation of our prior co-pending application, Serial No. 689,446, now abandoned.

This invention relates to the thin metal inserts used in tire molds to form slots in the tread of the tire. These inserts are embedded in and project from the tread-forming portion of the plaster of paris core against which the mold is cast. When the mold is cast against the core, the projecting portions of the inserts become embedded in the mold, and the portions of the inserts which were embedded in the core, project from the tread-forming portion of the mold, to form slots in the tire tread corresponding to the configuration or pattern of the projecting portions of the insert.

In the past, certain bladed inserts for cast tire molds have been formed by bending or curving thin strips of metal. This method limited the design configuration in the tire to the extent that it could only take the shape of a single continuous slot. More complex designs could be obtained only by the use of several separate inserts in combination with each other.

In the latter case, the correct placement of these individual inserts was difficult to control, resulting in inaccuracy of design and excessive labor cost.

The subject invention is a means for overcoming many of the problems previously inherent in the production of tire molds employing tire mold inserts of complex designs.

The primary object of the present invention is to construct a one-piece insert, which can produce a complex continuous or discontinuous tire tread slot configuration, which formerly required the use of several separate inserts. In accordance with the present invention this object is achieved by stamping out, or removing, sections of the insert material before the final bending operation. The remaining areas are embedded in the tire mold wall, and serve to locate accurately the exposed portions.

For a better understanding of these and other characteristics and advantages of the present invention, reference should be had to the following description and the accompanying drawings, wherein FIG. 1 is a perspective view of a three bladed insert;
FIG. 2 is an elevational view of the blank from which the insert in FIG. 1 was formed;
FIG. 3 is a perspective view of a portion of a tire tread showing the slotted formation resulting from the use of the insert shown in FIG. 1;
FIG. 4 is a perspective view of a four bladed insert;
FIG. 5 is an elevational view of the blank used to make the insert in FIG. 4;
FIG. 6 is a perspective view of a tire tread portion showing the slotted formation of insert in FIG. 4;
FIGS. 7, 8 and 9 show the method used for multiple bladed inserts resulting in a disconnected pattern in the tire tread;
FIGS. 10 and 11 show a modification of FIG. 4;
FIG. 12 is a perspective view showing an insert in a plaster model of a tire tread; and
FIG. 13 is a perspective view of a portion of a mold showing inserts of FIG. 1 embedded therein.

Referring to the drawings, a simple form of the invention is shown in FIGS. 1, 2 and 3. An insert 10 is shaped as shown in FIG. 1, having slot forming portions 11, 12, and 14, and a double thickness portion 13. The line A—B designates the separation line between the portions of the insert embedded in the mold and the portions which form the slots in the tire tread. The three upper portions of blades 11, 12 and 14, shown in FIGS. 1 and 2, make up the design 15 in the tire tread rib 16, shown in FIG. 3, while the four lower parts of 11, 12, 13 and 14 are embedded in the mold material. Lines X, Y and Z, shown in FIG. 2 designate the locations for bending or folding the insert to the shape as shown in FIG. 1.

As shown in the blank illustrated in FIG. 2, the slot forming sections 11, 12 and 14 are substantially but not necessarily twice the width of section 13 and in shaping the insert shown in FIG. 1, the section 13 is bent along line Y into face-to-face contact with section 12. Thus, the three-bladed insert can be stamped from a single sheet of material and bent to form a unitary structure. The extra thickness of the overlap of sections 12 and 13 provide a double thickness with a shoulder 13a to assist in anchoring the insert in the mold.

The slot configuration or pattern produced by this insert is shown in the tire tread rib 16 in FIG. 3. Without this invention the slot configurations shown in FIG. 3 would require two separate inserts; one to form the slots 11a and 12a and another to form the slot 14a.

A more complex form of the invention is shown in FIGS. 4, 5 and 6, wherein a four-bladed design is illustrated. An insert 17, FIG. 4, is shaped from a blank 17a, shown in FIG. 5, having blades 18, 19, 22 and 23 which constitute the design of the insert 17, while connecting portions 20 and 21 make the shaping of the design possible and also help to anchor the insert in the mold material. The line of separation between mold and tire is designated by C—D, while the bending or folding locations are designated by lines R, S, T, U and V. The resulting slotted formation 24 in the tire tread rib 25 is shown in FIG. 6.

In practicing the above two forms of the invention the blanks may be stamped or cut from sheet material and shaped on forming dies or by hand to the design required. In FIG. 1 the portions 12 and 13 are folded together on line Y and the other portions bent as desired on lines X and Z. In FIG. 4, the fold lines are S and U while the bend lines are R, T and V.

Another form of the invention is shown in FIGS. 7, 8 and 9 wherein a multiple-spaced, bladed insert is formed in one piece in order to hold the blades in the desired spaced relation to each other. An insert 26 is shaped from a blank 26a comprised of parts 27, 28, 29, 30 and 31 which are defined by the bend lines M, N, O and P. The blades 27, 29 and 31 are the portions projecting from the mold and tire tread separating line E—F, and form the slots 32, 33 and 34 in the tire tread rib 35. The remaining portions below the line E—F are embedded in the mold material with parts 28 and 30 assisting in anchoring the insert 26 in the mold. In this form of the invention the sections 28 and 30 act as spacers for the other sections 27, 29 and 31. The slot pattern formed by the insert is shown in a tire rib 35 in FIG. 9.

FIGS. 10 and 11 show a modification of the insert shown in FIG. 4. In this form of the invention parts 21a and 22a are not folded completely together on line U'. Parts 19a and 20a likewise are not folded together on line S'. Also, parts 20a and 21a are bent at an obtuse angle to one another, thereby holding the angular bladed inserts 18a—19a and 22a—23a in spaced relation to one another. The resulting design 36 in the tire tread rib 37 is shown in FIG. 11.

FIG. 12 shows the insert 10 of FIGS. 1 and 2 applied to a plaster core from which the mold is made.

The bladed portions comprised of 11, 12 and 14 are pressed into the plaster 38 to the depth represented by the line A—B in FIG. 2. Insertion to the proper depth may be accomplished by means of a spacer shim 39 placed under the edge of portion 13 of the insert, or in any other desired manner. FIG. 13 shows this insert 10 embedded in a mold produced from the core shown in FIG. 12.

The extent to which the subject invention can be adapted is not intended to be limited to the designs shown in the drawings and herein disclosed, which describe only the basic principles of the invention. Other variations of the above designs, direction and degree of bending, number of blades per insert and the general resulting slotted configurations are to be considered as within the spirit and scope of the invention.

Having thus described our invention, what we claim and desire to protect by Letters Patent is:

1. A method of making a tire mold insert to form a slot pattern in the tread portion of a pneumatic tire, said slot pattern being characterized by having at least three slots arranged radially from a common center, comprising dividing a rectangular slot forming tire mold insert into at least four portions,
 a first portion equal in length to one slot,
 the second and third portions each equal to the length of a second slot, and
 the fourth portion equal to the length of a third slot;
cutting one edge of said insert away across the entire length of said third portion;
bending said insert between said first and second portions to an angle determined by the desired angle between said first and second slots;
bending said insert between said second and third portions so that said third portion lies flat against said second portion; and
bending said insert between said third and fourth portions to an angle determined by the desired angle between said second and third slots, whereby the entire uncut edge of said insert may be embedded in the tire mold.

2. In the manufacture of the tread-forming portion of a tire mold for the molding of a repetitive tread pattern of slots in the tread portion of a pneumatic tire, said pattern of slots being characterized by having at least three slots arranged radially from a common center, the improvement comprising dividing a thin rectangular strip of material into at least four portions,
 the first portion equal in length to one slot,
 the second and third portions each equal to the length of a second slot,
 and the fourth portion equal to the length of a third slot,
cutting one edge of said strip away across the entire length of said third portion;
bending said strip between said first and second portions to an angle determined by the desired angle between said first and second slots;
bending said strip between said second and third portions so that said third portion lies flat against said second portion;
bending said strip between said third and fourth portions to an angle determined by the desired angle between said second and third slots; and
embedding the entire uncut edge of said strip in the mold wall so that said third portion is entirely embedded in the mold and only the slot forming portions of said strip protrude there beyond.

References Cited in the file of this patent
UNITED STATES PATENTS

| | | |
|---|---|---|
| 1,708,615 | Groehn et al. | Apr. 9, 1929 |
| 2,275,582 | Bull | Mar. 10, 1942 |
| 2,732,589 | Steadman | Jan. 31, 1956 |
| 2,779,060 | Knox | Jan. 29, 1957 |
| 2,896,281 | Miller et al. | July 28, 1959 |